(12) United States Patent
Ius et al.

(10) Patent No.: US 9,816,217 B2
(45) Date of Patent: Nov. 14, 2017

(54) DAMPER WITH DISPLACEMENT SENSOR FOR LAUNDRY APPLIANCE

(75) Inventors: Nicola Ius, Zoppla (IT); Stefano De Paoli, Fiume Veneto (IT); Thomas Peuker, Ammerthal (DE); Andreas Pelczer, Altdorf (DE)

(73) Assignee: Electrolux Home Products Corporation N.V., Brussels (BE)

( * ) Notice: Subject to any disclaimer, the term of this patent is extended or adjusted under 35 U.S.C. 154(b) by 165 days.

(21) Appl. No.: 13/637,819

(22) PCT Filed: Mar. 3, 2011

(86) PCT No.: PCT/EP2011/053230
§ 371 (c)(1),
(2), (4) Date: Apr. 15, 2013

(87) PCT Pub. No.: WO2011/120758
PCT Pub. Date: Oct. 6, 2011

(65) Prior Publication Data
US 2013/0192312 A1 Aug. 1, 2013

(30) Foreign Application Priority Data

Mar. 31, 2010 (EP) .................................... 10158586

(51) Int. Cl.
*F16F 9/22* (2006.01)
*G01B 7/14* (2006.01)
(Continued)

(52) U.S. Cl.
CPC ................ *D06F 33/00* (2013.01); *F16F 9/22* (2013.01); *F16F 9/3292* (2013.01); *G01B 7/14* (2013.01); *Y10T 29/49826* (2015.01)

(58) Field of Classification Search
CPC ............... D06F 33/00; G01B 7/14; F16F 9/22
See application file for complete search history.

(56) References Cited

U.S. PATENT DOCUMENTS 2,807,695 A * 9/1957 Delmonte .................... 338/150
4,577,509 A * 3/1986 Moser ................ F15B 15/2853
267/64.11
(Continued)

FOREIGN PATENT DOCUMENTS

DE 100 51 056 4/2002
DE 10 2004 040587 4/2006
(Continued)

OTHER PUBLICATIONS

International Search Report issued in corresponding International Application No. PCT/EP2011/053230 dated Apr. 6, 2011.
(Continued)

*Primary Examiner* — Michael Barr
*Assistant Examiner* — Tinsae Ayalew
(74) *Attorney, Agent, or Firm* — Banner & Witcoff, Ltd.

(57) ABSTRACT

A displacement sensor module 1 for mounting on a telescopic-type damper 30, a damper/detector assembly including such a displacement sensor module and a telescopic-type damper, and a household appliance including such a damper/detector assembly is provided. The displacement sensor module 1 includes at least one coil element 4, an electronic detection unit 8 connected to the at least one coil element 4 and adapted to detect an impedance change of the at least one coil element, and a coil housing 2 for receiving and additionally or alternatively a coil support 6 for supporting the at least one coil element 4 and for supporting the electronic detection unit 8. The displacement sensor module 1 is adapted to be mounted on a telescopic-type damper 30, wherein in particular the housing 2 or support 6 is adapted to fit over a portion of a pre-assembled damper 30.

15 Claims, 4 Drawing Sheets

(51) Int. Cl.
*D06F 33/00* (2006.01)
*F16F 9/32* (2006.01)

(56) References Cited

U.S. PATENT DOCUMENTS

| | | | |
|---|---|---|---|
| 6,858,801 B1* | 2/2005 | Brown | H05K 5/0247 |
| | | | 174/560 |
| 2006/0053839 A1* | 3/2006 | Matsushima et al. | 68/3 R |
| 2007/0023244 A1* | 2/2007 | Carlson et al. | 188/267 |
| 2008/0017461 A1* | 1/2008 | Park | F16F 7/09 |
| | | | 188/266 |

FOREIGN PATENT DOCUMENTS

| | | | | |
|---|---|---|---|---|
| EP | 1 878 940 | | 1/2008 | |
| EP | 1 964 696 | | 9/2008 | |
| WO | 2008/012651 | | 1/2008 | |
| WO | WO 2008012651 A2 * | 1/2008 | | D06F 37/20 |

OTHER PUBLICATIONS

Extended European Search Report issued in corresponding European Application No. 10158586.7, dated Oct. 18, 2010.

* cited by examiner

Fig. 4

DAMPER WITH DISPLACEMENT SENSOR FOR LAUNDRY APPLIANCE

BACKGROUND OF THE INVENTION

The invention relates to a home appliance, in particular a washing machine, a washing machine having dryer function or dryer, comprising a telescopic-type damper having a displacement sensor module mounted thereon.

EP 1 220 961 B1 discloses a damper for a washing machine. The damper comprises a piston movable in a cylindrical housing and a device to measure the position of the piston inside the housing. According to one embodiment, the device comprises a coil unit wound around the housing of the damper and a sensor element located at the end of the piston, which is located inside the cylindrical housing. The sensor element is made of metal, e.g. iron. The coil unit is connected by wire to an evaluating unit of the washing machine, which is located at an inner wall of the casing of the washing machine. When the piston and therefore the sensor element of the damper moves, e.g. due to loading the washing machine with laundry, the sensor element changes the inductivity of the coil unit. As the change of inductivity is proportional to the penetration depth of the piston into the coil unit, the travel path length of the piston can be determined by the evaluating unit.

WO 2008/012651 A2 discloses a household appliance, like a washing machine, with a displacement sensor. The displacement sensor measures the relative displacement between a cylinder and a piston of a damper for a washing group of a household appliance. According to one embodiment, a coil is wound around the cylinder of a damper and is connected by wire to an electronic detection module, which is fixed to the cylinder with screws. At least a part of a piston of the damper, which is located inside the coil, comprises ferromagnetic material, wherein the value of the inductance of the coil depends on the axial penetration of the piston within the volume of the coil. Further, the electronic detection module comprises an oscillator circuit, the oscillation frequency of which depends on the impedance of the coil on the damper cylinder. The relative displacement of the cylinder and piston is determined by the electronic detection module as a function of the oscillator circuit. A microcontroller included in the electronic detection module locally processes the signal output of the oscillator unit in order to obtain the relative displacement and additionally or alternatively any other physical quantities associated with the relative displacement, like the weight of laundry placed inside the drum of the washing group.

SUMMARY OF SELECTED INVENTIVE ASPECTS

It is an object of the invention to provide a displacement sensor module for a damper of a household appliance, a method for mounting a displacement sensor on a damper, an assembly comprising a displacement sensor and a damper, as well as a household appliance comprising such an assembly, which allow an easy and convenient handling of such a displacement sensor module.

In an aspect, the invention provides a displacement sensor module for a telescopic-type damper of a household appliance, like a washing machine, a washer-dryer or a dryer. Telescopic-type dampers comprise at least two telescopically coupled elements, e.g. a piston which is disposed coaxial movable in a damper casing. In use the displacement sensor module is mounted on, in particular slipped-on, a telescopic-type damper and the sensor module is adapted to detect the displacement between the at least two telescopically coupled elements, e.g. between a piston and a damper casing. In other words, the sensor module is adapted to detect the relative displacement between the telescopically coupled elements. A displacement occurs for example due to the weight of laundry loaded into a tub of a washing machine, i.e. due to a lowering of a washing group unit, which is damped by at least one telescopic-type damper. Such dampers may be arranged between a lower part of the tub of the washing unit and the bottom or lower part of a household appliance housing, e.g. a friction damper, hydraulic damper or spring damper. To determine the displacement or lowering of the tub, preferably it is sufficient that only one of the telescopic-type dampers is provided with a displacement sensor module.

In as aspect of the invention, the displacement sensor module comprises at least one coil element, and a coil housing for receiving the at least one coil element. Additionally or alternatively a coil support is provided for supporting the at least one coil element. The at least one coil element may comprise at least one electromagnetic coil, e.g. a solenoid or Helmholtz coil. In contrast to prior art displacement sensors or weight sensors for dampers, the separate parts of the displacement sensor module according to an aspect of the invention are combined in one unit, i.e. module or single element, which is therefore easy to handle and can be conveniently mounted on a telescopic-type damper in only one mounting step. That means a pre-assembled damper can be easily provided with a displacement sensor module. In particular, the coil housing or the coil support is adapted to fit over a portion of a pre-assembled damper, e.g. over the casing of the damper. This is particularly advantageous during assembling or the fabrication of a damper with such a displacement senor module, as thereby the assembling time and consequently production costs are drastically reduced. Furthermore, if it should be necessary to replace the sensor module in use—e.g. due to the need of maintenance or due to a defect of the sensor module—the sensor module itself can be easily replaced without the necessity to replace the complete damper onto which the sensor module is mounted. This is particularly advantageous with respect to relatively high-priced dampers, like spring or oil-hydraulic dampers. The same applies in case the damper onto which the sensor module is mounted should be replaced. That means, due to the modularity of the displacement sensor module, only the necessary parts of a damper with the displacement sensor module is replaced, which saves a considerable amount of costs. Preferably mounting of the displacement sensor module on a damper, in particular a pre-assembled damper, is accomplished by a slip-on or screw-on movement, in particular without the need of tools.

According to a preferred embodiment, the displacement sensor module comprises means to attach the displacement sensor module to a telescopic-type damper, in particular to a casing of a telescopic-type damper. Preferably the attaching means allow a releasable attaching of the sensor module to a damper, e.g. in case the sensor module or the damper needs to be replaced or maintained. The attaching means may be a snap-fitting, snap-in, hook-on, screw-on or latch lock, which provide an easy attaching and additionally or alternatively an easy detaching of the sensor module from a damper.

Preferably the displacement sensor module comprises an electronic detection unit connected to the at least one coil element, wherein more preferably the coil housing and/or the coil support supports or carries the electronic detection unit, i.e. coil element and electronic detection unit are supported by the same support element. The electronic detection unit is adapted to detect an impedance change of the at least one coil element. Such an impedance change occurs in use of the displacement sensor module on a telescopic-type damper due to the movement of an element of the telescopic-type damper, e.g. piston, within the electromagnetic field of the at least one coil element. Preferably the electronic detection unit comprises a printed circuit board having circuitry adapted to detect an impedance change of the at least one coil element.

Preferably at least a portion of the damper piston which is located in or is movable within the at least one coil element comprises a material that alters a magnetic field generated by the at least one coil element. In an embodiment such a material is an electrically conductive material like iron or steel or any other ferromagnetic material. As described above, the penetration depth of such a material, i.e. piston, into the coil element or the magnetic field of the coil element is proportional to the change of inductance of the coil element. Therefore the relative displacement between the telescopically coupled elements can be determined, i.e. the displacement of the piston inside the damper casing or the volume of the coil element.

To determine the displacement—and thereby associated quantities like weight—in an embodiment the electronic detection unit may comprise pre-processing components, in particular oscillating components forming an oscillator circuit when electrically connected to the at least one coil element. When the electronic detection unit includes pre-processing capability, interference signals or other noise sources have lower effect due to shorter wiring lengths between coil and detection electronics. Further compatibility of the add-on or upgrade displacement sensor module to existing control electronics in a home appliance, in particular a washing mashing or dryer is improved.

In an embodiment a relative displacement between the telescopically coupled elements of a damper is determined from the change of the oscillation frequency, which depends on the change of inductance of the coil element. Alternatively the displacement between the telescopically coupled elements is determined directly from the impedance change, which is proportional the displacement between the elements. Preferably the electronic detection unit comprises a microcontroller adapted to evaluate the measurement results. Preferably the microcontroller is adapted to determine the weight of laundry loaded into a drum of a washing unit that is dampened by a damper with a displacement sensor module according to the invention.

Preferably the electronic detection unit is connected to an electronic control unit of a household appliance by a wire or alternatively wireless. Preferably the electronic control unit of the household appliance uses an already evaluated, i.e. a pre-processed, measurement result of the sensor module to control a dryer program or a washing program. Additionally or alternatively the electronic control unit is adapted to evaluate the detected signals of the electronic detection unit, e.g. for determining the weight of the laundry. For example, in dependency of the determined weight of the laundry loaded into the drum of a washing unit, an appropriate amount of water and/or detergent is provided into the tub.

According to a preferred embodiment the coil housing or the coil support comprises a unit holder adapted to receive the electronic detection unit. The unit holder provides a secure seating for the detection unit, preferably in form of a keyed connection between the holder and the detection unit. Additionally or alternatively the coil housing or the coil support comprises a unit housing, in particular a housing which holds the detection unit in place in form of a frame at least partially surrounding the detection unit. That means the electronic detection unit, i.e. its printed circuit board, can be attached to the coil housing without using further attaching means like screws or the like, which would require tools. This allows easy attaching and detaching of the detection unit and therefore easy assembling of the displacement sensor module itself.

Preferably the sensor module comprises a cover in form of a lid to cover the electronic detection unit mounted at the unit holder, preferably a cover for closing the unit housing. The cover may be attached to the sensor module, e.g. to the coil housing, coil support or unit housing, in form of a hinge. Alternatively it may be completely detachable from the sensor module or unit housing. The cover provides additional protection for the electronic detection unit from external influence, e.g. during assembling, replacement or maintenance of the sensor module or an associated damper. In an embodiment, the unit holder and/or lid are made of an electromagnetically shielding material or are coated with an electromagnetic shielding material.

Preferably the coil housing or the coil support, the unit holder and additionally or alternatively the unit housing are formed one-piece, in particular by injection moulding.

According to a preferred embodiment the least one coil element comprises contact plugs or a socket to electric contact terminals of the electronic detection unit, in particular a socket or plug connected to the terminals of the detection unit. Preferably a contact plug of the coil element directly contacts the terminals of the detection unit, i.e. no additional wiring between coil element and detection unit is necessary. For example the terminals of the detection unit are contacted by pins attached to terminals of the coil element, when the detection unit is inserted into or plugged in the unit holder. Alternatively, terminals of the coil element are electrically contacted by contact elements, e.g. contact pins, of the detection unit. Thereby assembling of the sensor module is further facilitated as with only one movement the detection unit is securely received in the holder and an electrical contact between the detection unit and the coil element is established. Alternatively terminals of the coil element are directly electrically connected to terminals of the electronic detection unit. For example the end portions of the coil winding wire are electrically connected to corresponding coil terminals of the electronic detection unit. Electronic connection may be provided by welding, soldering or mechanically fixing.

Preferably the coil support supports the at least one coil element, e.g. at least one electromagnetic coil, e.g. a solenoid. The at least one electromagnetic coil may be wound around the coil support, e.g. a cylinder. Alternatively the at least one coil may be at least partially integrated or embedded in coil support. Thereby the coil element is mechanically stable and easy to handle. Further, when using a coil element with a coil support, the coil is protected during handling, mounting or slipping of the displacement sensor module onto a damper. Alternatively the coil element is self-standing. For example with respect to a solenoid, a wire is wound and fixed by means of an adhesive substance, which keeps the wire in position when the substance cools down or is solidified. When using a self-standing coil element, the coil is in direct contact with a damper casing on which the coil element is mounted.

According to a preferred embodiment, the at least one coil element is embedded at least partially integrally in the coil housing, in particular at least one coil is embedded in the coil housing. Thereby the amount of parts which have to be handled during assembling of the displacement sensor module is reduced, whereby assembling of a sensor module is further facilitated. Further, the coil element, i.e. the coil, is protected by the coil support or the coil housing surrounding the coil.

Preferably the coil housing and additionally or alternatively the coil support is formed of a magnetic permeable material, such that an electromagnetic field of the at least one coil element is not disturbed by the housing or support. According to a preferred embodiment the coil housing and additionally or alternatively the unit housing is shielding the at least one coil element and/or the electronic detector unit from outside electromagnetic fields. Thereby the quality of the measurement signals of the senor module is further improved.

Preferably the coil housing, the coil support and additionally or alternatively the at least one coil element comprises a central aperture, i.e. through hole, to receive a telescopic-type damper therein, in particular a damper casing. In case the at least one coil element is embedded in the coil housing, the aperture is provided in the coil housing. Alternatively, when a coil support supports the at least one coil element, the coil support and/or the at least one coil element comprise such an aperture. Preferably the aperture cross-section corresponds to the cross-section of the damper casing on which the sensor module is to be mounted, wherein the aperture dimension is sufficient to allow an easy mounting or slipping of the displacement sensor module on a damper casing.

In a related aspect, the invention provides a damper/detector assembly comprising a displacement sensor module and a telescopic-type damper as described above and comprising the above described advantages. A telescopic-type damper comprises at least two telescopically coupled elements, wherein the part of the element, which is movable within the volume of a coil element of the sensor module, comprises a material which is adapted to alter the magnetic field of the coil element as described above. This material can be a separate element attached to a piston end located inside the volume of the coil element, when the sensor module is mounted on the damper. Alternatively the piston itself is made of a material adapted to alter the magnetic field of the coil element.

In a further aspect, the invention resides in a household appliance comprising at least one damper/detector assembly, i.e. a telescopic-type damper with a displacement sensor module as described above. A household appliance like a washer, washing machine having a dryer function or dryer comprises a drum to receive laundry to be treated therein. The washing unit (or dryer unit) is damped by at least two dampers, which are located between the washing unit (or drying unit) and a bottom part of the household appliance casing. To determine for example the weight of the laundry in an embodiment it is sufficient to provide one of the dampers with a displacement sensor unit as described above.

The invention further resides in a method for mounting a displacement sensor module to a telescopic-type damper. A displacement sensor module and a damper as described above are provided. The sensor module, i.e. a housing or support of a coil element of the sensor module, is mounted or slipped on an outer surface, i.e. casing, of the damper. Then the sensor module is releasably attached to the damper. Preferably the attachment between sensor module and damper is achieved during or by the mounting movement, for example by a snap-fitting between the sensor module, i.e. coil housing and/or coil support, and the damper casing. That means the mounting step is at the same time the attaching step. Preferably an electronic detection unit as described above is connected to a coil element of the sensor unit prior to mounting the sensor module to the damper. Alternatively the electronic detection unit is connected to a coil element after mounting the sensor module to the damper. A connection between a coil element and a detection unit can be achieved by contact elements, e.g. socket and plugs, as described above.

The embodiments and steps described above and below in connection with the displacement sensor module, the damper/detector assembly and/or the household appliance also may be used individually or in a sub-combination in the above-described method for mounting a displacement sensor module to a telescopic-type damper.

BRIEF DESCRIPTION OF THE DRAWINGS

Reference is made in detail to a preferred embodiment of the invention, an example of which is illustrated in the accompanying figures, which show.

DETAILED DESCRIPTION OF EXAMPLE EMBODIMENTS

Figure 1:
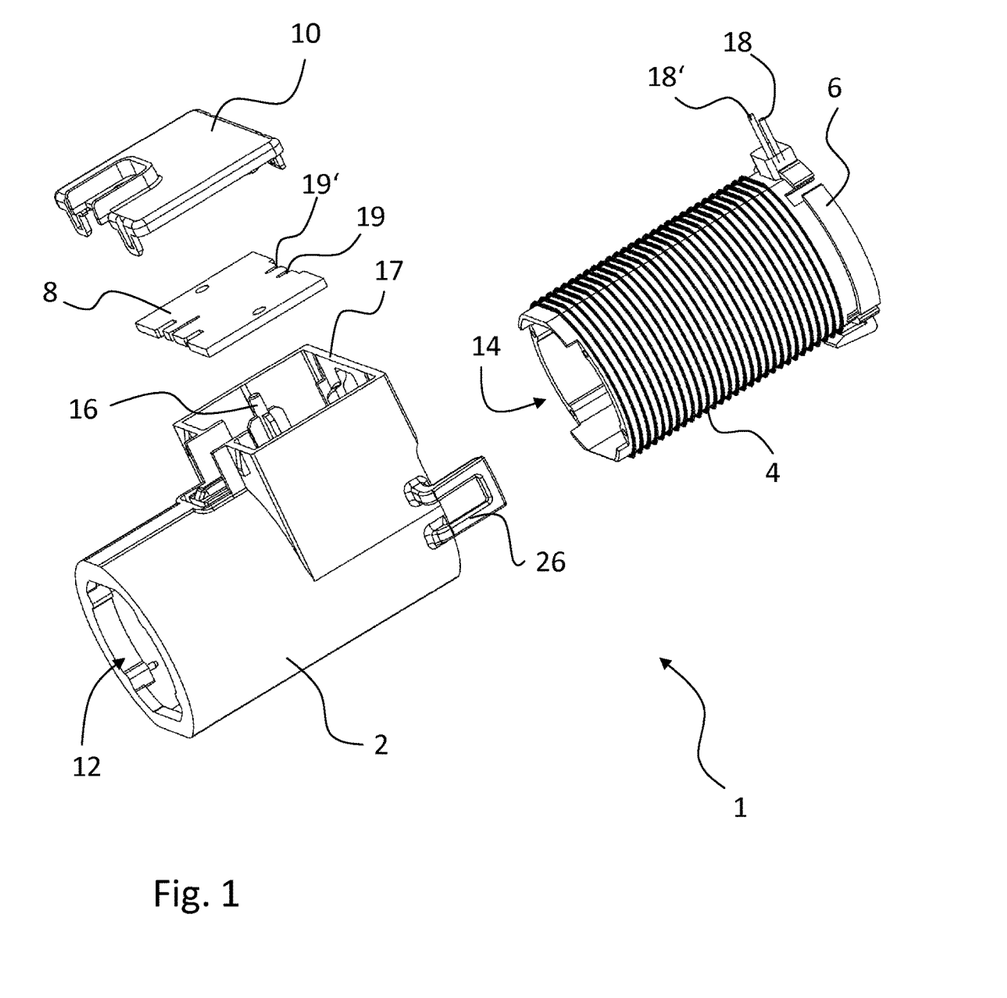
FIG. 1 an exploded view of a displacement sensor module.

FIG. 1 depicts an exploded view of a displacement sensor module 1. The sensor module 1 comprises a sensor module housing 2, which comprises a central aperture 12 to receive a coil element therein. The coil element comprises a coil 4 wound around a support cylinder 6. The sensor module housing 2 further comprises a holder 16 and a component housing 17 for receiving an electronic detection component 8 therein. Preferably, the housing 17 is formed integrally with the sensor module housing 2. The terminals of the coil 4 are connected to pins 18, 18' seated on the support cylinder 6. When the support cylinder 6 with the coil 4 is inserted into the sensor module housing 2, the pins 18, 18' are located within the housing 17. When an electronic detection module or component 8 is inserted into its holder 16 through the open side of the housing 17, the pins 18, 18' directly contact terminals 19, 19' of the detection component 8. Further, the dimension of the holder 16 and the housing 17 is such that the detection module 8 is securely held in place without the need of additional fastening means. To protect the detection module 8 a lid 10 is provided, which covers the open side of the housing 17. The support cylinder 6 comprises an opening 14, which is sized to receive a damper casing 20 of a telescopic-type damper 30 (FIG. 2a).

Figure 2A:
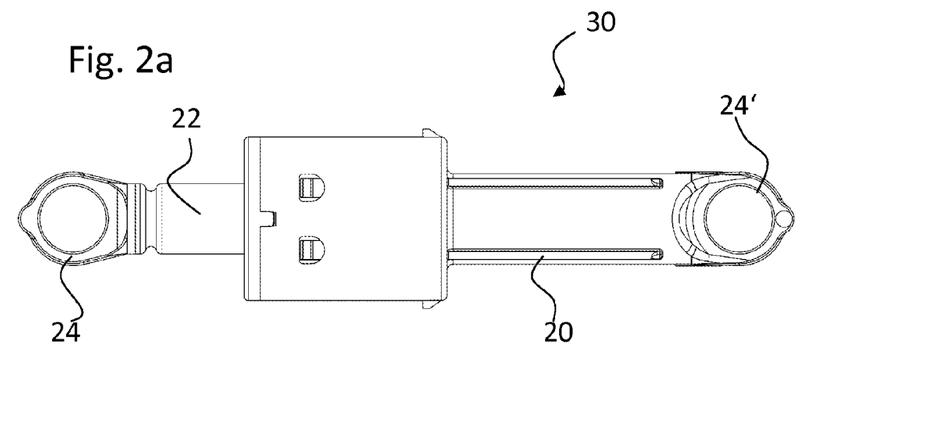
FIGS. 2a to 2c the phases during mounting the assembled displacement sensor module of FIG. 1 on a telescopic-type damper, FIG. 3 a cross-sectional side view of the displacement sensor module of FIG. 1 on a telescopic-type damper of FIG. 2a, and FIG. 4 a schematic view of a washing machine comprising a telescopic-type damper with a displacement sensor module.
Figure 2B:
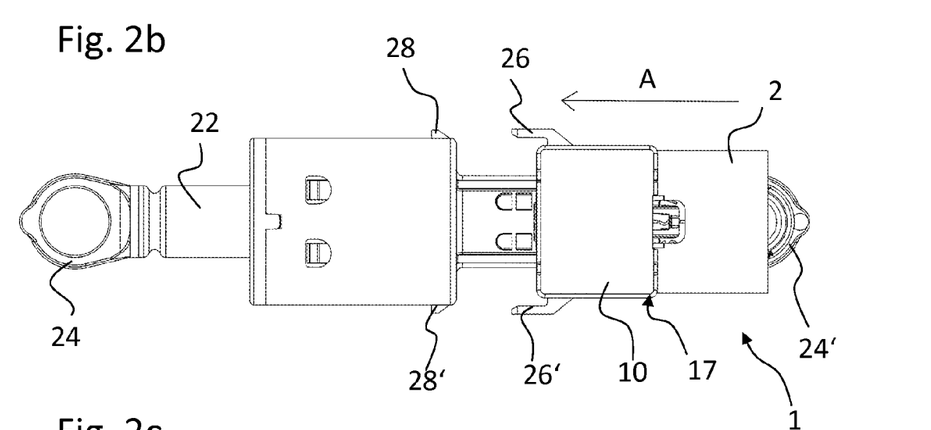
Figure 2C:
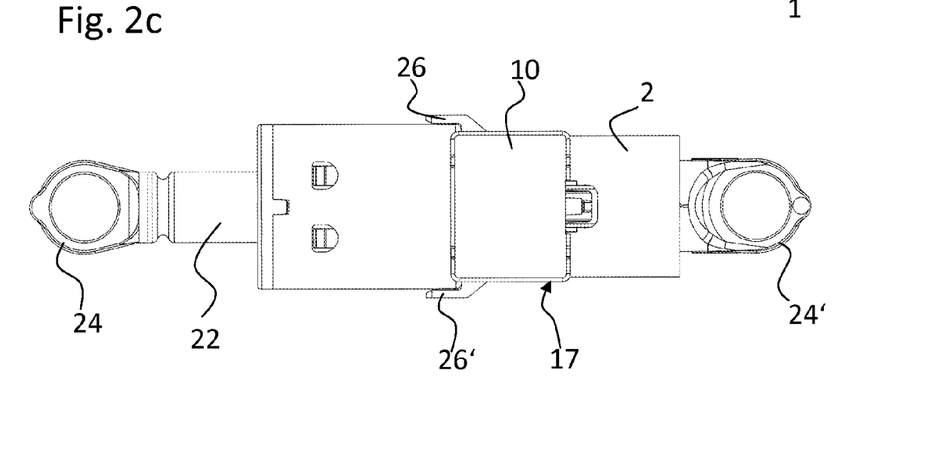
Figure 4:
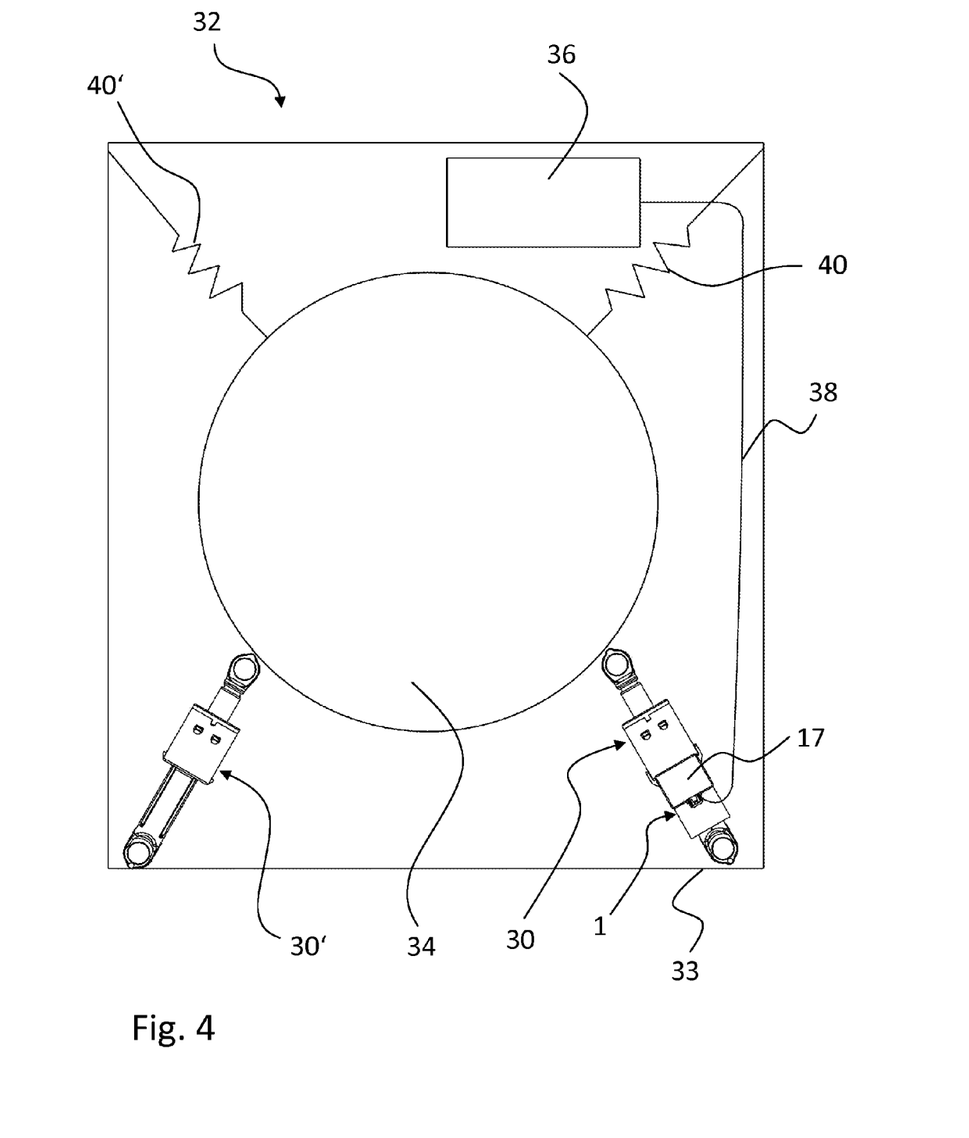

FIGS. 2a to 2b show the phases during mounting the assembled displacement sensor module 1 onto a telescopic-type damper 30. The damper 30 comprises a piston 22 movable in a damper casing 20. FIG. 2a shows the damper 30 before the displacement sensor module 1 is mounted thereon. A first seat 24 is arranged at the outer end of the piston 22 and a second seat 24' is arranged at the outer end of the casing 20. At the seats 24, 24' the damper is fixed at a movable part and a stationary part of a household appliance. E.g. seat 24 is connected to a tub 34 of a washing machine 32 and seat 24' is connected to the body 33 of the washing machine 32 (FIG. 4). FIG. 2b shows an intermediate phase during mounting or slipping the displacement sensor module 1 onto the damper casing 20, wherein the mounting movement or direction A is represented by an arrow. Latches 26, 26' of the displacement sensor module 1 are adapted to snap-fit with corresponding projections 28, 28' on the damper casing 20, such that the displacement sensor module 1 is securely held in place, as depicted in FIG. 2c.

Figure 3:
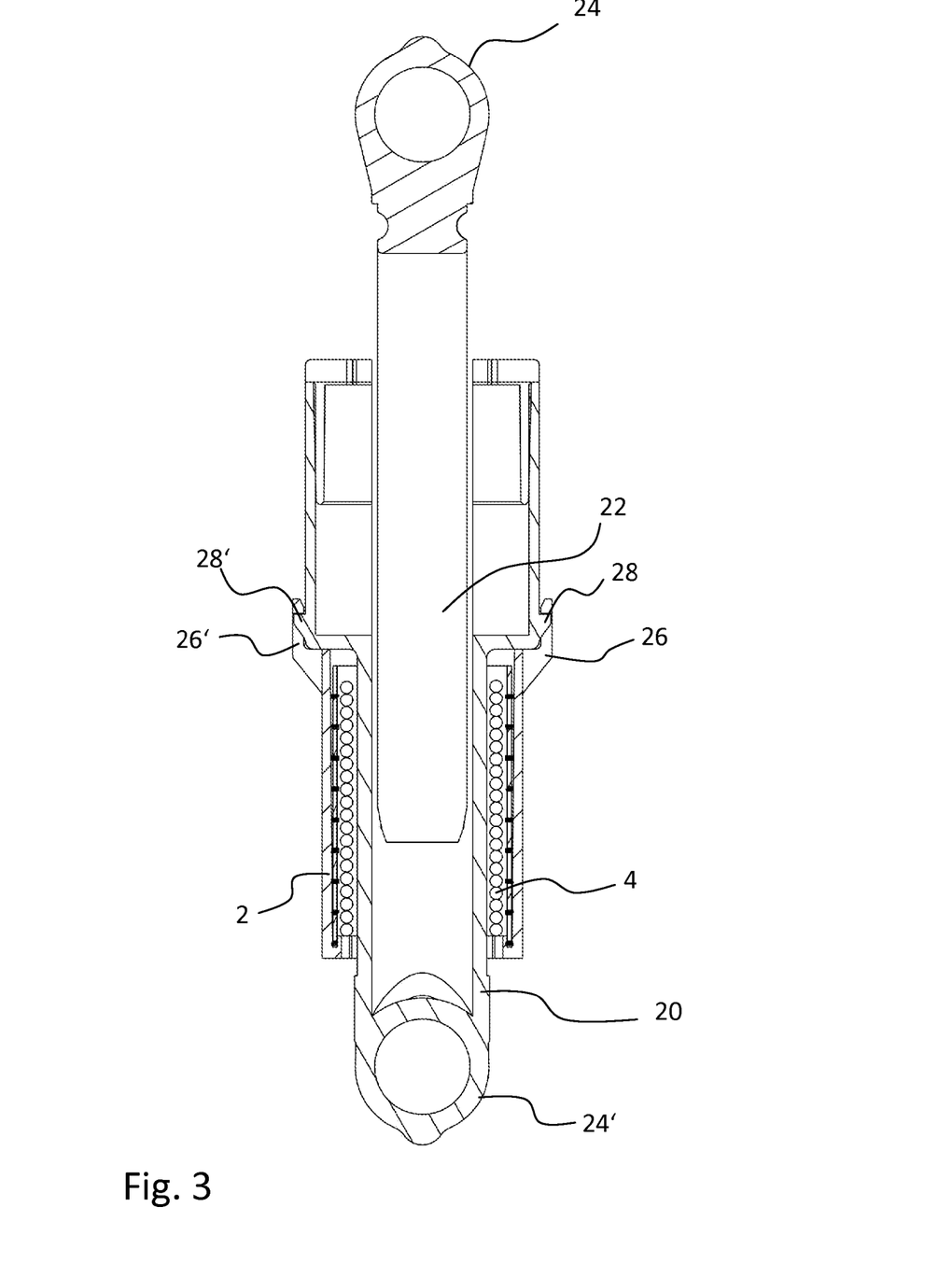

FIG. 3 shows a cross-sectional side view of the damper 30 with the displacement sensor module 1 of FIG. 1. The coil 4 cylindrically surrounds the damper casing 20, wherein the lower end of the piston 22 lies within the inner volume of coil 4. At least a part of the piston 22 lying within the coil 4 comprises a material (not shown), which is adapted to alter the magnetic field of the coil 4. The inductance or impedance of the coil 4 is proportional to the penetration depth of the piston, i.e. the material, into the coil 4 volume, i.e. proportional to the displacement of the piston 22. The electronic detection module 8 (not shown) is connected to the coil 4 and detects the change of inductance of the coil 4, whereby the displacement of the piston 22 can be determined, for example by a microcontroller of the detection component 8. In case the displacement of the piston 22 occurs due to laundry loaded into a drum of the washing unit 34 or tub, which is dampened by such a damper 30, the laundry weight can be determined in dependency of the change of inductance of the coil 4, whereby the displacement sensor module is equivalent to a weight sensor module.

FIG. 4 shows a schematic view of the washing machine 32. The tub of the washing unit 34 is suspended at springs 40, 40', which are attached to a body 33 of the washing machine 32. The tub 34 is supported and dampened from below with the telescopic-type dampers 30, 30', wherein one damper 30 comprises a displacement sensor module 1 as described above. The electronic detection module 8 is connected by a wire 38 to a control unit 36 of the washing machine 32. Thereby the control unit 36 can either evaluate measurement signals of the displacement sensor unit 1, e.g. determine the weight of laundry from a change of inductivity of the coil 4, or the control unit 36 receives pre-processed measurement signals from the electronic detection component 8. For example the value of the detected laundry weight, which can be used to adjust the washing program, e.g. the amount of water supplied to the drum of the washing unit 34.

REFERENCE NUMERAL LIST 1 displacement sensor module
2 coil housing
4 coil
6 support cylinder
8 electronic detection component/module
10 lid
12 aperture
14 support cylinder opening
16 holder
17 component housing
18, 18' pin
19, 19' terminal
20 damper casing
22 piston
24, 24' seat
26, 26' latch
28, 28' projection
30, 30' damper
32 washing machine
33 body
34 washing unit/tub
36 control unit
38 wire
40, 40' spring
A mounting direction

The invention claimed is:

1. A damper/detector assembly comprising:
a displacement sensor module including at least one coil element, and a coil housing for receiving, and/or a coil support for supporting, the at least one coil element; and
a telescopic-type damper for a washing machine, the telescopic-type damper including a damper casing and at least one piston coaxially movable therein against resistance, wherein the telescopic-type damper is configured to dampen movement of a wash group unit of the washing machine,
wherein at least a portion of the piston comprises a material or is formed of a material adapted to alter an electromagnetic field of the coil element of the displacement sensor module, the displacement sensor detecting a displacement of the telescopic-type damper based on an alteration of the electromagnetic field by the at least a portion of the piston and,
wherein the displacement sensor module comprises attaching means for releasably mounting the displacement sensor module so as to fit the coil housing and/or the coil support over a portion of the damper casing such that the coil element is outside of the damper casing and the at least a portion of the piston is inside the damper casing out of contact with the coil element,
wherein the coil housing and/or the coil support is separate from and mounted over the damper casing.

2. A damper/detector assembly according to claim 1, wherein the attaching means is configured to releasably attach the displacement sensor module to the telescopic-type damper coaxially thereover.

3. A damper/detector assembly according to claim 1, further comprising an electronic detection unit connected to the at least one coil element and adapted to detect an impedance change of the at least one coil element, wherein the coil housing and/or the coil support further supports the electronic detection unit.

4. A damper/detector assembly according to claim 3, wherein the electronic detection unit is connectable to an electronic control unit of the washing machine by a wire connection or a wireless connection.

5. A damper/detector assembly according to claim 3, wherein the coil housing or the coil support comprises a unit holder and/or a unit housing adapted to receive the electronic detection unit.

6. A damper/detector assembly according to claim 5, further comprising a lid for covering the electronic detection unit mounted at the unit holder, and/or closing the unit housing.

7. A damper/detector assembly according to claim 5, wherein the coil housing or the coil support, is formed as one piece with the unit holder and/or the unit housing.

8. A damper/detector assembly according to claim 3, wherein the at least one coil element is directly electrically connected to contact terminals of the electronic detection unit.

9. A damper/detector assembly according to claim 1, wherein the at least one coil element is integrally embedded in the coil support.

10. A damper/detector assembly according to claim 1, wherein the at least one coil element is embedded integrally in the coil housing.

11. A damper/detector assembly according to claim 3, wherein the coil housing and/or the coil support is formed of a magnetic permeable material which is not electric conductive, and/or wherein the coil housing and/or the unit housing shields the at least one coil element and/or the electronic detection unit from outside electromagnetic fields.

12. A damper/detector assembly according to claim 1, wherein the coil housing, the coil support and/or the at least one coil element comprises a central aperture to receive a telescopic-type damper casing.

13. A laundry appliance, comprising a wash group unit and at least one damper/detector assembly according to claim 1, wherein the telescopic-type damper of the at least one damper/detector assembly is configured to dampen movement of the wash group unit of the laundry appliance.

14. A damper/detector assembly according to claim 2, wherein the attaching means includes a latch designed to releasably engage with a portion of the damper casing.

15. A method for mounting a displacement sensor module on a telescopic-type damper configured to dampen movement of a wash group unit of a washing machine, comprising the steps of:
providing a displacement sensor module comprising at least one coil element, a coil housing receiving, and/or a coil support supporting, the at least one coil element, and attaching means for releasably attaching the displacement sensor module to the telescopic-type damper;
mounting the displacement sensor module so as to fit over an outer surface of the telescopic-type damper; and
releasably attaching the coil housing and/or the coil support to the outer surface of the telescopic-type damper via the attaching means, wherein the mounting comprises slipping the coil housing and/or the coil support coaxially onto the outer surface of the telescopic-type damper.

* * * * *